UNITED STATES PATENT OFFICE.

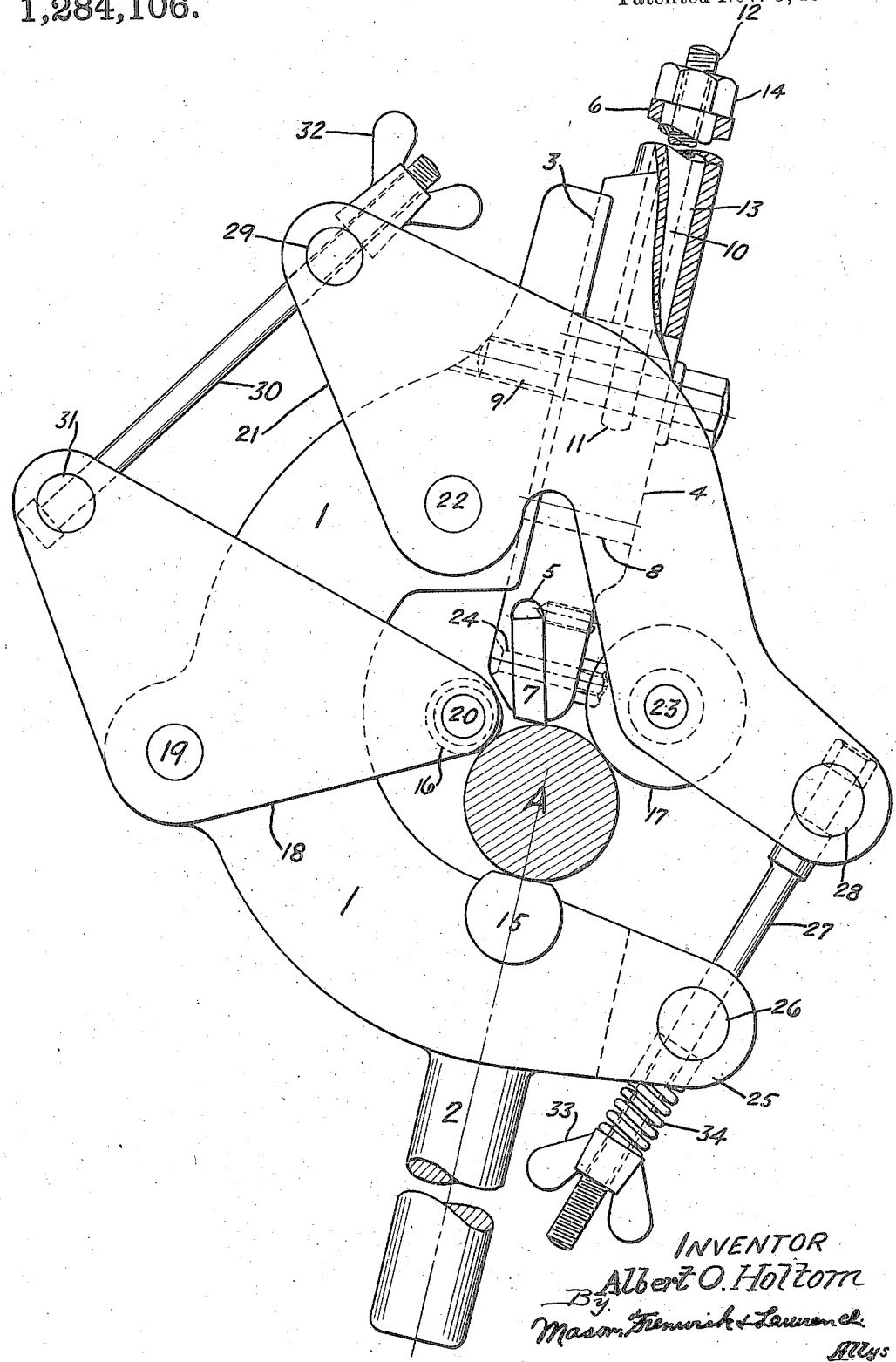

ALBERT O. HOLTOM, OF LONDON, ENGLAND.

APPARATUS FOR TRUING JOURNALS.

1,284,106.

Specification of Letters Patent.     Patented Nov. 5, 1918.

Application filed January 4, 1917. Serial No. 140,654.

*To all whom it may concern:*

Be it known that I, ALBERT O. HOLTOM, a subject of the King of England, a resident of London, England, (post-office address Plainfield, N. J.,) have invented certain new and useful Improvements in an Apparatus for Truing Journals, of which the following is a specification.

This invention is a hand device and is particularly adapted for truing up crank shafts of automobiles and the like, where it is not convenient to put the same in a lathe or grinder.

Referring to the drawing, A represents a piece of stock or journal upon which the device is set for the purpose of making the same perfectly round, and it is presumed that this stock has been worn so that it is slightly elliptical.

In the drawing 1 represents the frame of the device to which is rigidly attached a handle 2. Opposite this handle 2 is a guide-way 3, in which is mounted a square tool holder bar 4, which slides in the guide-way 3. This tool holder bar 4 is shown broken in the drawing, the back end of which is extended so as to form a handle 6.

At the other end of this tool holder bar is a slot 5 in which is mounted the cutting tool 7. This cutting tool may be adjusted in the frame in any desirable way, but as shown the bar 4 has an elongated slot 8, through which passes cap screw 9, which is threaded into the frame 1. This cap screw 9 is spanned by an eye-bolt 10, on one end of which is the eye 11 and the other end of which is threaded at 12.

Through a hole bored in the handle 6 is a sleeve 13, on one end of which is formed a hexagon end 14. This sleeve is threaded to receive the eye bolt 10.

It can be seen that by easing off the cap screw 9 and sliding this sleeve through the hexagon end 14, the cutter bar and its cutter will be adjusted to and from the work the desired amount, and the bar can then be re-clamped by the cap screw 9.

For the purpose of centering the work in relation to this cutter bar so that it will true up the journal, the frame is preferably provided with a rigid support 15, and two adjustable supports 16 and 17. These two adjustable supports 16 and 17 are preferably mounted on two bars of adjustable bearing supports.

Plates 18 are pivotally mounted upon the pin 19, which holds them in position on the two sides of the frame. These plates 18 have a pin 20 also holding them together, and upon this pin is the roller 16 which acts as a support for the stock.

Other plates 21 are pivoted on the pin 22, which holds these plates 21 in position on the two sides of the frame. These plates 21 have a pin 23 also holding them together, and upon this pin is the roller 17 which acts as a support for the stock. This roller 17 is grooved so as to span the tool clamping screw 24.

The manner in which these adjustable supports are moved to hold the work may be varied widely in construction, but as shown the frame 1 of the device is bifurcated at 25 and the two prongs hold a pivot stud 26, through which passes a link 27, one end of which is attached to a pivot stud 28.

This link 27 passes between the two plates forming the adjustable bearing support 21. The other end of these plates is provided with a pivot stud 29, in which is mounted the link 30, which passes between the two plates forming the adjustable bearing support 21, and also between the two plates 18, in which is mounted the pivot stud 31.

By means of the wing nuts 32 and 33 it can be seen that the rollers 16 and 17 acting as stock supports can be adjusted to bear against the stock. It can now be seen that by grasping the handles 2 or 6 or both, the device can be revolved about shaft or bearing with the tool held in definite relation to the stock.

Assuming that stock A is slightly elliptical and that said tool is set to bear against the minor axis of the ellipse so that when the device is revolved about the shaft it will remove stock from the bearing.

Between the nut 33 and the pin 26 is a spring 34, which acts as a compensating device and yieldingly holds both supports 16 and 17 against the work so that as the device is revolved about the bearing the cutting tool tends to correct its inequalities by cutting away the stock until the three supports will revolve concentric about the work, thus truing up the bar.

What I claim is:—

1. A journal truing device comprising a frame, and a plurality of supports for holding the journal; one of said supports being mounted on a pivoted lever, said pivoted lever being spring actuated to force the support against the journal, and holding it in position against the other supports, said frame also holding a cutting tool and means whereby the frame may be revolved around the journal.

2. A journal truing device comprising a frame, and a plurality of supports for holding the journal; two of said supports being mounted on pivoted levers, said pivoted levers being spring actuated to force the supports against the journal, and holding it in position against the fixed support, said frame also holding a cutting tool, and means whereby the frame may be revolved around the journal.

3. A journal truing device comprising a frame, having a support fixed thereto, a pair of levers pivoted on said frame, said levers each supporting a roller to act as journal supports; an adjustable link connecting the two levers, and a spring actuated adjustable link connecting one of the levers with the frame; an adjustable cutting tool mounted on the frame, means whereby the frame may be revolved around the journal.

4. A journal truing device comprising a frame having a handle formed thereon, a cutting tool adjustably carried by said frame, a plurality of supports carried by said frame, one of said supports being fixed in said frame directly opposite to the cutting edge of the cutting tool, others of said supports being yieldably mounted to follow the contour of the work, and plates pivotally carried by said frame for said yieldable supports.

5. A journal truing device comprising a frame, a cutting tool adjustably carried by said frame, a plurality of work supports carried by said frame, one of these supports being fixed in said frame opposite to the edge of the cutting tool, others of said supports being yieldably mounted, plates pivotally carried by said frame for said yieldable support, a link extensibly connecting the ends of some of said plates, and a second link extensibly and yieldably connecting others of the ends of some of the plates with said frame.

6. A journal truing device comprising a frame having a handle formed thereon, a guide formed in said frame, a tool holder slidable in said guide, having a portion of the length slotted, and having a longitudinal bore therein, said tool holder forming a handle for said frame, a cutting tool adjustably carried by said tool holder, a locking screw passing through said slot into said frame, an eye bolt in said longitudinal bore and slot in said tool holder, having the eye therein engage said locking screw, and an adjusting nut carried by said tool holder, having engagement with said eye-bolt.

7. A journal truing device comprising a frame having a handle formed thereon, a guide formed in said frame, a tool holder slidable in said guide, a cutting tool detachably carried by said holder, said holder having a portion of its length slotted, and having a longitudinal bore therein, said holder forming a handle for said frame, a locking screw passing through said slot in said holder and into said frame, an eye-bolt in said tool holder, in the longitudinal bore and slot, the eye-bolt having a threaded stem, the eye of said bolt receiving said locking screw, an adjusting nut and sleeve carried by said holder having engagement with the threaded stem of said eye-bolt, a plurality of supports carried by said frame, one of said supports being fixed in said frame directly opposite to the cutting edge of the cutting tool, others of said supports being yieldably mounted, plates pivotally carried by said frame, said plates supporting said yieldable supports, a link adjustably connecting some of the ends of said pivoted plates, and a second link extensibly and yieldably connecting others of the ends of some of said plates with said frame.

In witness whereof, I have hereunto set my hand in the presence of two subscribing witnesses.

HAL HOLTOM.

Witnesses:
K. R. MAYINHAM,
H. E. SCARBOROUGH.